United States Patent Office 3,444,127
Patented May 13, 1969

---

3,444,127
PREPARATION OF ORDERED POLY(ARYLENE-SILOXANE)POLYMERS
James E. Webb, Administrator of the National Aeronautics and Space Administration, with respect to an invention of Laurence W. Breed, Overland Park, Kans., and Richard L. Elliott, Kansas City, Mo.
No Drawing. Filed Sept. 15, 1967, Ser. No. 668,751
Int. Cl. C08g 47/02; C09d 3/82; C07f 7/02
U.S. Cl. 260—46.5        4 Claims

ABSTRACT OF THE DISCLOSURE

Poly(arylenesiloxane) polymers having the formula

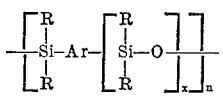

where Ar is an arylene group, R is a monovalent hydrocarbon radical and $x$ is a whole number from 3 to 5 are prepared by reacting an arylenedisilanol with a cyclic siloxazane compound. These polymers show outstanding stability at elevated temperature, resistance to radiation and capability for formation into films for use as coatings or elastomers.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to poly(arylenesiloxane) polymers and more particularly to novel poly(arylenesiloxane) polymers having an ordered molecular structure.

Poly(arylenesiloxane) polymers exhibit favorable properties for materials applications in the aerospace field, for example, as coatings or elastomers for use in the space environment. Polymers based on the presence of arylene groups together with the —Si—O— linkage characteristic of silicones in the backbone of the repeating unit offer the prospect of improved stability at relatively high temperatures and resistance to radiation and vacuum conditions, along with many of the favorable properties of the silicones.

Various types of poly(arylenesiloxane) polymers have been synthesized by previous workers. Ordered polymers having the formula

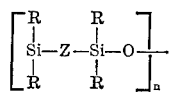

where Z is an arylene group and R is a monovalent hydrocarbon radical having been prepared by condensation of arylenedisilanols in the presence of a catalyst, these polymers and their process of preparation being the subject matter of U.S. Patent 2,562,000, issued July 24, 1951 to Michael Sveda. Other previously known poly(arylenesiloxane) polymers include random arylenedisilanol-polydimethylsiloxane copolymers, as described by George M. Omietanski in U.S. Patent 3,187,029, block arylenedisilanol-polydimethylsiloxane copolymers, as disclosed by Merker, Scott and Haberland, J. Polymer Sci., A2, 31 (1964) and random copolymers based on bis-(dimethylsilyl) benzene siloxane and bis-(dimethylsilyl) phenylether siloxane units, as described by Omietanski in U.S. Patent 3,287,310. The properties of these polymers have been limited by such factors as the presence of long siloxane segments, which decrease their high-temperature stability, by the presence of long poly(arylenesiloxane) units, which increase the melting point and crystallinity and therefore increase their useful low temperature range, or by their random structure which tends to decrease high-temperature stability.

SUMMARY OF THE INVENTION

The novel poly(arylenesiloxane) polymers of the present invention have an ordered molecular structure as represented by the following formula

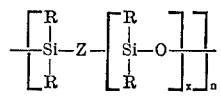

where Z is an arylene group, R is a monovalent hydrocarbon radical and $x$ is a whole number from 3 to 5. Polymers having this formula are prepared by reacting an arylenedisilanol with a cyclic siloxazane compound. The ordered polymers of this invention are stable to a temperature of about 500° C., and they exhibit outstanding resistance to radiation, along with other favorable properties such as film-forming capability and elastomeric characteristics.

DESCRIPTION OF THE PREFERRED EMBODIMENTS

The arylene group, represented by Z in the formula given above for the polymers of the present invention, can be a single phenylene ring structure such as m-phenylene or p-phenylene; a diphenylene group; or a group consisting of two phenylene groups linked by one or more heteroatoms such as oxygen. Polymers wherein Ar is a biphenylene ether group have shown the most favorable overall properties.

The monovalent hydrocarbon radicals represented by R can be alkyl groups such as methyl, ethyl, propyl and the like; aryl groups such as phenyl, naphthyl, and the like; aralkyl groups such as benzyl or phenylethyl; cycloalkyl groups such as cyclopentyl or cyclohexyl; or alkaryl groups such as tolyl, xylyl and the like. More than one of these groups can be present in the same polymer, for example a methyl and a phenyl group can be attached to the silicon atoms adjacent the arylene groups.

The polymers of the present invention can be prepared in molecular weights from about 10,000 to 1,000,000, which correspond to values of $n$ from about 15 to 3,000, depending upon the composition of the particular polymer.

The novel poly(arylenesiloxane) polymers of this invention can be prepared by reacting an arylenedisilanol with a cyclic siloxazane compound. The silanol reactant is represented by the formula

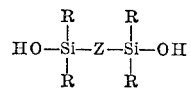

where Z and R have the meanings given above. Illustrative examples of silanols which can be used include p-phenylenebis(dimethylsilanol), m - phenylenebis(dimethylsilanol), p-phenylenebis(methylphenylsilanol), m-phenylenebis(methylphenylsilanol), p - phenylenebis(diphenylsilanol), and bis(p-dimethylhydroxysilylphenyl) ether. Silanols of this type can be prepared by reaction of arylenebis(dialkoxysilanes) such as p-phenylenebis(dimethylethoxysilane) with sodium hydroxide according to the method disclosed by R. L. Merker and M. J. Scott in J. Polymer Sci., A2 (1964) 15 or by other previously known methods.

The cyclic siloxazane reactant is selected to provide the desired molecular structure. For polymers having three siloxane groups in the repeating unit (a value of 3 for $x$ in the polymer formula) a siloxazane having the formula

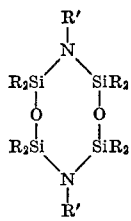

where R has the meaning given above and R' is a hydrogen atom or an alkyl group such as methyl, ethyl or the like, is employed. Compounds wherein R' is methyl are preferred since they are more stable against hydrolysis and thus more easily managed in the process. These compounds react with the silanol at a ratio of one mole per two moles silanol to give a primary amine and the polymer. This group of compounds is exemplified by decamethyl-1,5-diaza-3,7-dioxa-2,4,6,8-tetrasilacyclooctane.

For polymers having four or five siloxane groups in the repeating unit (a value of 4 or 5 for $x$ in the polymer formula) a siloxazane having the formula

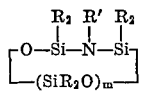

where $m$ is 1 or 2 respectively, and R and R' have the meaning given above, is used. Compounds of this type react with the silanol at equimolar proportions to give a primary amine and the polymer. The compounds where $m$ is 1 and 2 are exemplified by heptamethyl-1-aza-3,5-dioxa-2,4,6-trisilacyclohexane and nonamethyl - 1 - aza - 3,5,7-trioxa-2,4,6,8-tetrasilacyclooctane, respectively.

The cyclic siloxazanes described above can be prepared by reaction of α,ω-dichlorosiloxanes with an amine in a solvent such as petroleum ether. At low temperatures such as −30° C. this reaction produces linear bis(methylamino) siloxazanes, but at higher temperatures such as 50° C. the desired N-methylsiloxozanes are obtained at high yield. At intermediate temperatures such as 5 to 10° C., α,ω-bis(methylamino) siloxanes are produced, and the latter compounds can be condensed to N-methylsilaxozanes by heating in the presence of ammonium sulfate at 150 to 190° C.

The polymerization reaction can be carried out by heating a stoichiometric mixture of the silanol and the siloxazane. However, a slight excess, for examples, five percent of the stiochiometric amount, of the siloxazane is preferably used to compensate for the loss of this component by volatilization. A polymerization temperature from about 140 to 200° C. can be used, and best results are obtained at a temperature of 160 to 180° C. Polymerization is essentially completed in a period of 4 to 8 hours.

Polymerization can also be carried out in an organic solvent medium. Inert organic solvents such as toluene or xylene can be used for this purpose.

The resulting polymer can be applied as a metal surface coating by dissolving it in a suitable solvent such as toluene and spraying the solution onto the surface. Upon curing by heating at a temperature such as 150 to 200° C. a clear, smooth elastic coating is obtained. Hardening or crosslinking agents such as stannous octoate and t-butyl peroxybenzoate and pigments such as zinc oxide can be combined with the product polymer to provide improved coating formulations.

The poly(arylenesiloxane) polymers produced as described above exhibit thermal stability up to about 500 to 550° C., as compared with about 450° C. for previously known high-temperature silicones and 380° C. for typical random poly(arylenesiloxane) polymers.

The invention is further illustrated by the following examples.

Example I

Bis(p - dimethylhydroxysilylphenyl) ether and heptamethyl-1-aza-3,5-dioxa-2,4,6-trisilacylohexane were reacted for varying times at varying temperatures according to the following procedure to produce a poly(arylenesiloxane) polymer. A mixture of 0.0100 mole diol and 0.0105 (5% excess) or 0.0110 (10% excess) silazane was heated in a 25 by 140 mm. polymerization tube immersed in a Wood's metal bath. The resulting polymer was recovered in each case, and its inherent viscosity in 0.5% solution in toluene at 30° C. was determined. The results obtained may be seen by reference to the following table.

TABLE I (Polymerization of bis(p-dimethylhydroxysilylphenyl) ether and heptamethyl-1-aza-3,5-dioxa-2,4,6-trisilocyclohexane)

| Moles of Diol | Moles of Silazane | Polymerization Temperature and time (° C., Hrs.) | Inherent Viscosity [a] | Polymer Description |
|---|---|---|---|---|
| [b] 0.0100 | 0.0105 | 180°, 23 hrs | 0.40 | A tacky gum. |
| [b] 0.0100 | 0.0105 | 200°, 8 hrs | 0.38 | Do. |
| 0.0100 | 0.0110 | 140°, 1 hr.; 200°, 7 hrs | 0.94 | A clear gum. |
| 0.0100 | 0.0110 | 140°, 1 hr.; 180° 7 hrs | 1.73 | A rubbery solid. |
| 0.0100 | 0.0110 | 140°, 1 hr.; 100°, 7 hrs | 1.59 | Do. |
| 0.0100 | 0.0100 | 180°, 8 hrs | 0.38 | Viscous liquid. |
| 0.0100 | 0.0105 | 180°, 8 hrs | 2.12 | Rubbery solid. |
| 0.200 | 0.210 | 160°, 8 hrs | 3.58 | Do. |

[a] 0.5% solution in toluene at 30° C.
[b] Polymerization was run in a 50 ml. flask with stirring.

Example II

Other silanediols and cyclosiloxazanes were polymerized by the procedure of Example I, except as noted below. Further details and results may be seen by reference to the following table. In the table the silanediols are designated as follows:

(A) bis(p-dimethylhydroxysilphenyl) ether,
(B) m-phenylenebis(dimethylsilanol),
(C) p-phenylenebis(methylphenylsilanol) (isomer mixture),
(D) p-phenylenebis(diphenylsilanol),
(E) bis(p-methylphenylhydroxysilphenyl) ether,
(F) m-phenylenebis(methylsilanol),
(G) m-phenylenebis(diphenylsilanol), and
(H) p-phenylenebis(dimethylsilanol)

Cyclosiloxazanes are designated as follows:

(I) decamethyl-1,5-diaza-3,7-dioxa-2,4,6,8-tetrasilacyclooctane,
(J) nonamethyl-1-aza-3,5,7-trioxa-2,4,6,8-tetrasilacyclooctane, and
(K) heptamethyl-1-aza-3,5-dioxa-2,4,6-trisilacyclohexane.

TABLE II
(Polymerization of Other Silanediols and Cyclosiloxazanes)

| Run No. | Diol | Cyclosiloxazane | Polymerization Temperature and Time (° C., Hr.) | Inherent Viscosity | Polymer Description |
|---|---|---|---|---|---|
| 1 | A (0.00717 mole) | I (0.00359 mole) | 160°, 8 hrs | 0.49 | A gum. |
| 2 | A (0.0100 mole) | I (0.00525 mole) | 161°, 8 hrs | 3.18 | Rubbery solid. |
| 3 | A (0.0100 mole) | I (0.0051 mole) | 160°, 8 hrs | 2.48 | Do. |
| 4 | A (0.0100 mole) | J (0.0105 mole) | 160°, 8 hrs | 3.83 | Do. |
| 5 | B (0.0100 mole) | K (0.0105 mole) | 160°, 8 hrs | 1.60 | A gum. |
| 6 | C (0.0100 mole) | K (0.0105 mole) | 161°, 8 hrs | 0.15 | Liquid. |
| 7 | D (0.0100 mole) | K (0.00525 mole) | 160°, 8 hrs | | Solid. |
| 8 | E (0.0050 mlle) | K (0.00525 mole) | 159°, 8 hrs | | Do. |
| 9 | F (0.0100 mole) | K (0.0105 mole) | 160°, 8 hrs | 1.61 | A gum. |
| 10 | D (0.0050 mole) | K (0.00550 mole) | In 10 ml. of refluxing toluene 7 hrs | 0.21 | Elastic solid. |
| 11 | G (0.0050 mole) | K (0.00550 mole) | 155°, 0.75 hr | 0.66 | Do. |
| 12 | H (0.0100 mole) | K (0.0100 mole) | 160°, 8 hrs | 2.77 | A gum. |
| 13 | H (0.0050 mole) | I (0.00525 mole) | 161°, 8 hrs | 1.84 | Do. |
| 14 | H (0.0100 mole) | J (0.0105 mole) | 161°, 8 hrs | 2.48 | Do. |

Chemical analyses were performed on the product polymers, and glass transition temperatures were determined. The results may be seen by reference to the following table.

TABLE III
(Polymer Properties and Analyses)

| Polymer from Example II, Run No. | Glass Transition Temperature (° C.) | Empirical Formula | Analyses Calculated/Found | | |
|---|---|---|---|---|---|
| | | | C | H | Si |
| 3 | −37 | $C_{20}H_{32}O_4Si_4$ | 53.52/53.74 | 7.19/7.27 | 25.03/25.08 |
| 7 (Example I) | −52 | $C_{22}H_{38}O_4Si_5$ | 50.52/50.62 | 7.32/7.35 | 26.86/26.70 |
| 4 | −65 | $C_{24}H_{44}O_6Si_6$ | 48.27/48.02 | 7.43/7.34 | 28.23/28.11 |
| 12 | −72 | $C_{16}H_{34}O_4Si_5$ | 44.60/44.40 | 7.95/7.93 | 32.60/30.20 |
| 14 | −80 | $C_{18}H_{40}O_5Si_6$ | 42.80/42.76 | 7.98/7.99 | 33.37/33.19 |
| 5 | −75 | $C_{16}H_{34}O_4Si_5$ | 44.60/44.49 | 7.95/7.90 | 32.60/32.51 |
| 6 | | $C_{26}H_{38}O_4Si_5$ | 56.26/56.00 | 6.90/6.97 | 25.31/25.02 |
| 9 | −42 | $C_{26}H_{38}O_4Si_5$ | 56.26/56.23 | 6.90/6.83 | 25.31/25.08 |
| 10 | | $C_{36}H_{42}O_4Si_5$ | 63.66/63.75 | 6.24/6.25 | 20.68/20.45 |

Thermogravimetric analyses were performed on selected polymer samples to determine their heat stability. The samples were heated to 900° C. at a rate of 15° C. per minute in a nitrogen atmosphere, and their losses in weight were recorded. All samples except one showed a weight loss less than 10 percent at 500° C., and all showed weight losses of about 50 to 80 percent at 600° C.

The above examples are merely illustrative and are not to be understood as limiting the scope of the invention, which is limited only as indicated by the appended claims.

What is claimed is:

1. The process for preparing a polymer having the formula

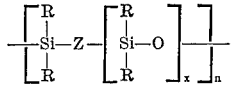

where Z is an arylene group, R is a monovalent hydrocarbon radical, $n$ is from 15 to 3,000 and $x$ is 3 to 5 which comprises reacting at a temperature of 140 to 200° C. a silanol having the formula

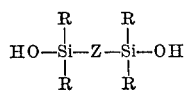

where Z is an arylene group and R is a monovalent hydrocarbon radical with a siloxozane in the group consisting of those having the formula

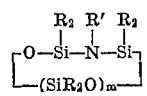

where $m$ is a whole number from 1 to 2, R is a monovalent hydrocarbon radical, and R' is an alkyl radical or a hydrogen atom and those having the formula

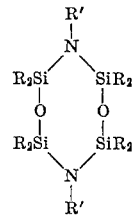

where R is a monovalent hydrocarbon radical and R' is an alkyl radical or a hydrogen atom.

2. The process according to claim 1 wherein a mixture of said silanol and siloxazane is heated at a temperature of 140 to 200° C. for 4 to 8 hours.

3. The process according to claim 2 wherein said mixture is heated at a temperature of 160 to 180° C.

4. The process of claim 2 where a slight stoichiometric excess of said siloxazane is provided in said mixture.

References Cited

UNITED STATES PATENTS

| | | | |
|---|---|---|---|
| 2,561,429 | 7/1951 | Sveda | 260—448.2 |
| 2,562,000 | 7/1951 | Sveda | 260—46.5 |
| 3,202,634 | 8/1965 | Merker | 260—46.5 |
| 3,287,310 | 11/1966 | Omietanski | 260—37 |
| 3,318,935 | 5/1967 | Spork | 260—448.2 |
| 3,350,350 | 10/1967 | Nitzsche et al. | 260—46.5 |

HOSEA E. TAYLOR, *Primary Examiner.*

M. I. MARQUIS, *Assistant Examiner.*

U.S. Cl. X.R.

117—161; 260—2, 448.2